Aug. 25, 1964  W. SCHUBERT  3,146,331
APPARATUS FOR PRODUCING HELICAL-SEAM PIPE
Filed Oct. 5, 1962  3 Sheets-Sheet 1

Willy Schubert
INVENTOR

BY *Mestern, Ross & Niestern*

AGENTS

Willy Schubert
INVENTOR

Mestern, Ross & Mestern
AGENTS

Willy Schubert
INVENTOR

BY Mestern, Ross & Mestern

AGENTS

United States Patent Office 3,146,331
Patented Aug. 25, 1964

3,146,331
APPARATUS FOR PRODUCING
HELICAL-SEAM PIPE
Willy Schubert, Dortmund, Germany, assignor to Hoesch Aktiengesellschaft, Dortmund, Germany, a corporation of Germany
Filed Oct. 5, 1962, Ser. No. 228,547
Claims priority, application Germany Oct. 18, 1961
12 Claims. (Cl. 219—62)

The present invention relates to apparatus for producing helical-seam pipe and, more particularly, to helical-seam welding apparatus wherein a metal band is fed generally tangentially into cylinder-forming means at an angle to the axis of the resulting tube to bring opposite edges of the band into juxtaposition for welding upon completion of one pitch unit or convolution of the tube. The resulting helical seam is progressively welded in the region whereat the opposite edges meet as the band is continuously fed into the cylinder-forming means and the completed tube emerges axially therefrom.

In the production of helical-seam pipe with the aid of the aforedescribed apparatus, it has been found that fluctuations in the width of the welding gap or in the abutting pressure of two edges has a considerable effect upon the quality of the seam. Thus, in arrangements wherein a welding gap is maintained between the two edges until filled with a weldment by deposition-welding techniques, such as electric-arc and gas-torch welding, it is important to minimize deviations above and below the desired value of the width of the welding gap. Similarly, when the seam is to be formed by fusion-welding techniques (e.g. resistance or induction welding), the opposite edges should be brought into abutting relationship with substantially constant pressure and deviations in the welding pressure above and below the desired value should be eliminated if substantially perfect welds are desired. To this end, it has been proposed that means be provided for swinging the emergent tube relative to the band fed into the cylinder-forming means in a horizontal plane in order to compensate for fluctuations in the welding gap. By displacing the tube in one sense so that the exposed edge of the last turn of the tube approaches the juxtaposed edge of the band, the gap is reduced in width, while rotation of the tube in the opposite sense effects a widening of the gap. Devices of this type have been either automatic or manually controlled, e.g. by an operator who observes the welding gap and then swings the tube upon detection of a deviation in gap width exceeding the predetermined tolerances. A major disadvantage of such devices resides in the fact that bending stresses are applied to the tube in the region between the welding zone and the area at which the torque is applied. Such bending stresses result in dislocation and distortion of the pipe, particularly when the latter has a low resistance to bending stress as is the case with relatively inelastic pipes.

It is an object of the instant invention to provide an improved apparatus for producing helical-seam pipe wherein the aforementioned disadvantages are avoided. A more specific object of the invention is to provide relatively simple and yet highly effective means, in an apparatus of the character described, for relatively adjusting the juxtaposed edges forming the seam.

These objects have been attained, in accordance with the present invention, by providing cylinder-forming means for winding a metallic band into a metal tube with a plurality of convolutions and feed means for continuously supplying the band generally tangentially to the cylinder-forming means at an angle to the axis thereof whereby opposite longitudinal edges of the band are juxtaposed upon completion of a convolution, with control means including a plurality of guide elements axially spaced apart generally transversely to the direction of displacement of the band in engagement therewith adjacent welding means for continuously joining the edges upon juxtaposition to form a helically extending weld. The guide elements are so constructed and arranged as to normally feed the band at the aforementioned angle of inclination which corresponds to the pitch angle of the tube or pipe emerging from the cylinder-forming means. Adjusting means are provided for angularly displacing the guide elements about respective axes perpendicular to the band while maintaining substantial parallelity between them so that they may include relatively small angles with the normal direction of band feed. Thus, the angle included between the band and the tube axis may be slightly increased or decreased to correspondingly adjust the welding gap or pressure.

According to a further feature of the invention, one set of such guide elements, consisting of transverse rows thereof longitudinally spaced along the band, is disposed on either side of the welding zone. Thus, a first set of elements may engage the undersurface of the feed band while a second set engages the exterior surface of the tube along the last-formed convolution or turn thereof adjacent the welding zone. The guide elements are, preferably, rollers journaled for rotation about axes parallel to the band and generally perpendicular to the seam-forming longitudinal edges thereof. The adjusting means for these elements comprises support means for the roller having freedom of yawing displacement about an axis perpendicular to the band. In the region of the completed portion of the tube, each support means is advantageously journaled for rotation about a generally radial axis. The adjusting means further comprises common actuating means for each of the sets of elements, thereby displacing them substantially simultaneously while maintaining them substantially parallel to adjust the relative positions of the juxtaposed edges. It has been found that best results are obtained when the two sets of elements are displaced in opposite senses to shift both of the edges to be welded with respect to a median line passing through the preferred welding position at the appropriate angle to the tube axis.

The cylinder-forming means may comprise a plurality of rollers axially spaced in arrays extending along generatrices of the completed tube. These rollers are generally disposed so that their axes of rotation extend at right angles to the advancing seam and are in engagement with the outer periphery of the tube. According to another aspect of the invention, the rollers of the cylinder-forming means adjacent the welding zone and, preferably, those occupying the quadrant of the progressively winding band preceding the welding zone are provided with adjusting means of the character described. In general, it has been found that the apparatus of the present invention, which permits adjustment of the two sets of guide elements in opposite senses to shift both edges with respect to a median line, results in highly improved welds and adherence to the predetermined tolerances.

To improve the effectiveness of the guide elements, the rollers engaging the underside or outer surface of the band may be supplemented by further sets of rollers, each associated with one of the main sets whereby the band is clamped between the auxiliary and main rollers. To this end, the auxiliary rollers should be adjustable in the same sense as the corresponding main rollers. The auxiliary rollers are, of course, disposed along the upper or interior surface of the band.

The above and other objects, features and advantages of the present invention will become more readily apparent from the following description, reference being made to the accompanying drawing in which.

Figure 1:
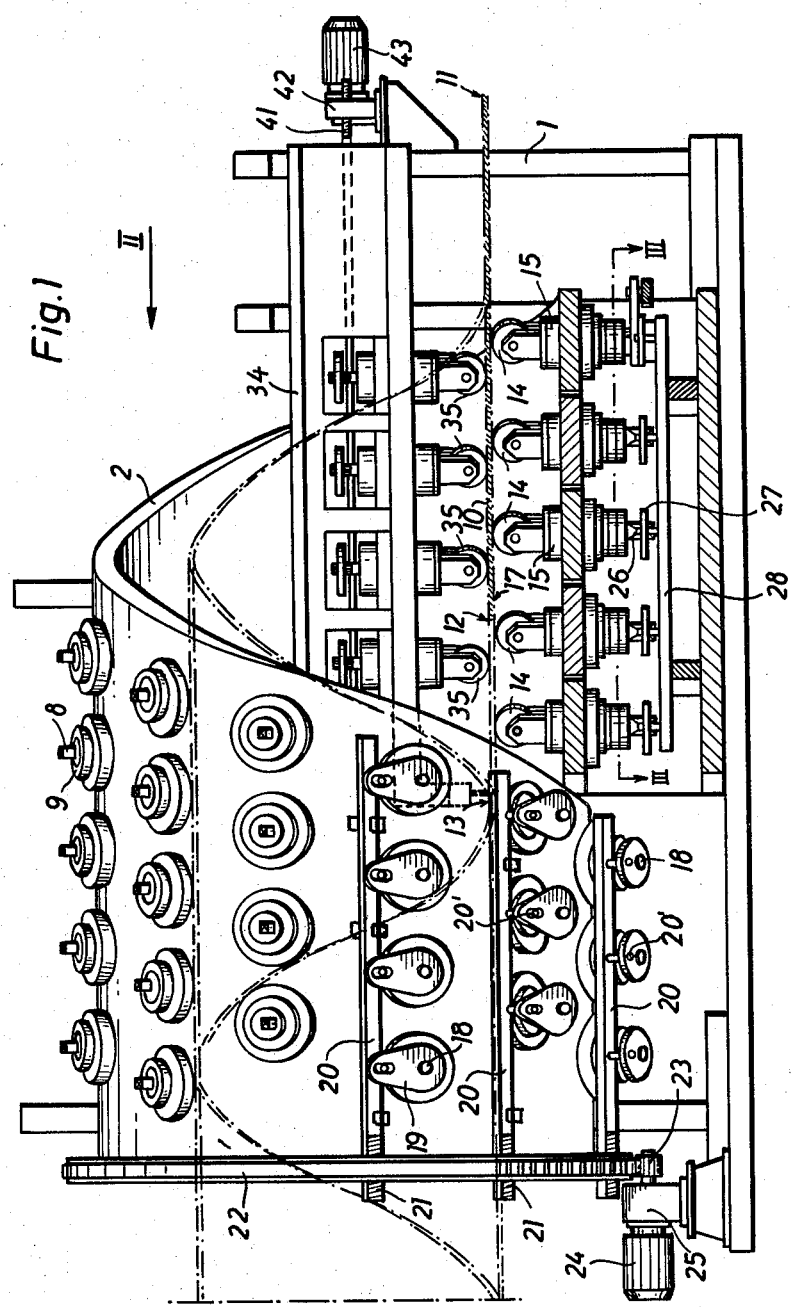
FIG. 1 is a side-elevational view of an apparatus for producing helical-seam pipe according to the invention.
Figure 2:
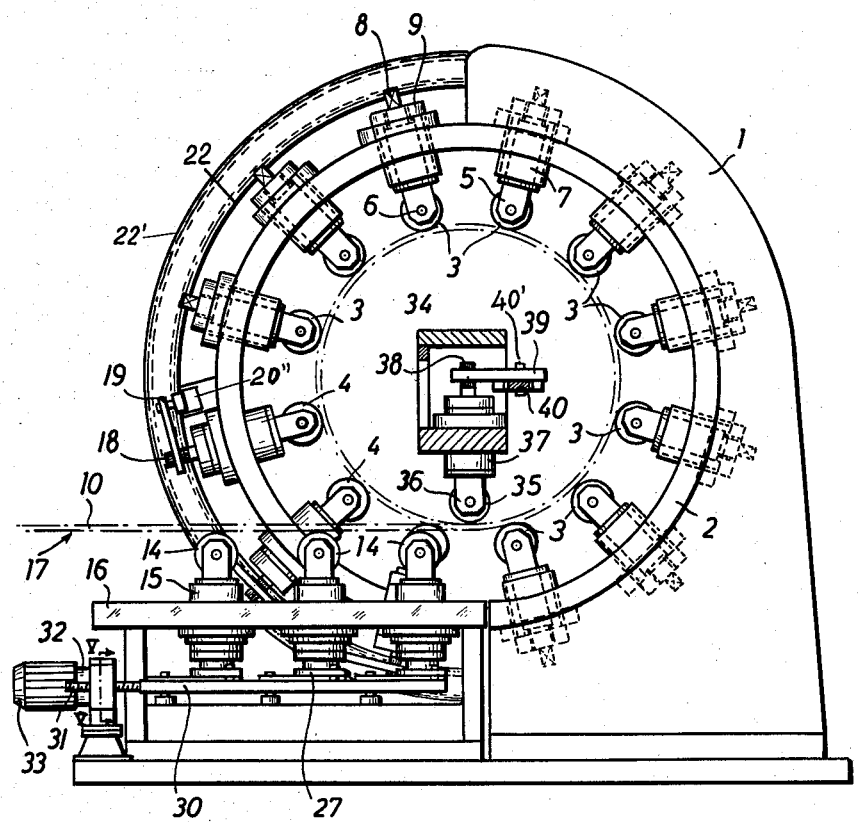
FIG. 2 is an end-elevational view, partly broken away, taken in the direction of arrow II in FIG. 1.
Figure 3:
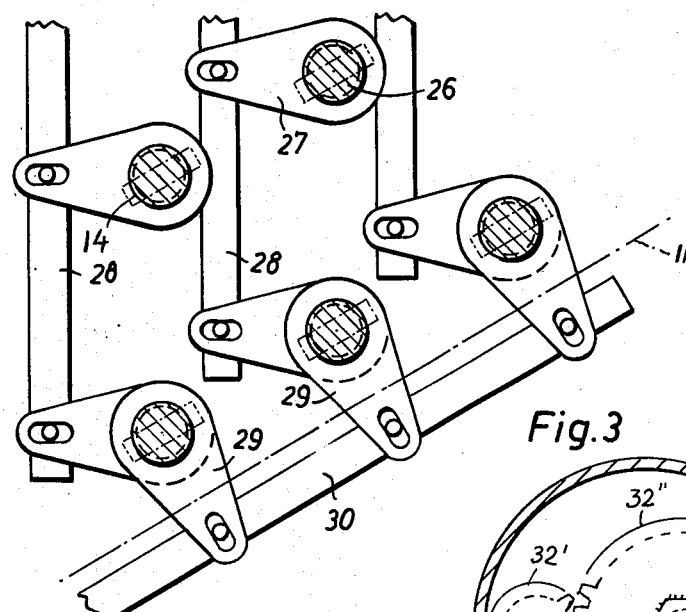
FIG. 3 is a plan view diagrammatically illustrating the actuating mechanism of one set of guide elements and taken along line III—III of FIG. 1.

The apparatus illustrated in FIGS. 1–3 comprises a base or frame 1 to which is fixed a cylindrical shell 2 whose axis is substantially horizontal. Shell 2 constitutes part of the cylinder-forming means which also includes a plurality of antifriction guide elements such as the rollers 3, 4. These rollers are journalled upon studs 6 carried in bifurcated support members 5 for rotation about respective axes parallel to the helically coiled band 10 but perpendicular to the seam-forming longitudinal edges thereof. The rollers thus lie in planes generally parallel to these edges. The support members 5 are provided with radially extending shanks 5' which are rotatably mounted in radial bushings 7 rigid with the shell 2. The threaded outer extremity 8 of the shank is provided with a prismatic (e.g. four-sided) wrench-receiving head and threadedly engages a nut 9. The angle included between the axis of each roller and the helical seam is readily adjusted by rotating the corresponding support member 5 within the threaded bushing 7 through which it passes and, thereafter, tightening the nut 9 to lock the support member in place. For the production of tubes with a single pitch angle and diameter, the rollers 3 require no further adjustment. In this connection it should be noted that the production of smaller-diameter pipe will require that the support members 5 extend radially a greater distance into the shell 2.

The band 10 fed into the cylinder-forming means has a right-hand longitudinal edge 11 (FIG. 1) and a left-hand edge 12 which are brought into juxtaposition after one turn of the band at the welding zone 13. The welding head may be of the conventional type shown in U.S. Patent No. 2,837,626, issued June 3, 1958 to M. P. Buck et al. wherein, as illustrated in FIG. 1, an electric arc-welding head 13' feeds a welding wire 13'' to a gap of constant width formed between the juxtaposed edges in the welding zone 13. The edges traverse the welding zone substantially parallel to each other. When induction or resistance welding is employed to form the seam, the two edges are urged together under pressure in this zone and an electric current is passed through this region. In addition to the bead of weldment deposited at zone 13 to fix the seam, further welding beads may be employed to fill the welding gap. For this purpose additional welding heads may be provided forwardly of the primary zone along the seam as disclosed in the aforementioned patent.

Rollers 4 constitute a continuously adjustable set of guide elements as contrasted with the fixed rollers 3 and occupy an entire quadrant of the cylinder-forming means in advance of the welding zone 13 in the sense of rotation of the band 10 (clockwise as seen in FIG. 2). This quadrant is the fourth of the last-formed full turn of the band. The stems 18 of the rotatable support members 5 carrying the rollers 4 extend through the radial bushings 7 and are milled to engage press-fitted arms 19 which rotate therewith. The arms of rollers 4 lying in rows along generatrices of the tube are interconnected for joint rotation about their radial axes by connecting bars 20 to which they are pivotally joined by pins 20'. The bars 20 are longitudinally shiftable on the shell 2 upon which they are mounted by brackets 20'' parallel to its axis and are formed with racks 21 at corresponding extremities. These racks 21 mesh with a ring gear 22 whose crown teeth 22' engage a pinion 23 driven by an electric motor 24 via a speed-reduction transmission 25. The rollers 4 adjust the position of band edge 11 relative to the other edge 12 and a median line therebetween passing through the weld point 13. A rotation of the ring gear 22 by motor 24 to shift the bars 20 in one direction (FIG. 1) results in a canting of the rollers to the seam such that edge 11 approaches edge 12, while opposite displacement of these bars shift edge 11 away from edge 12.

Figure 5:
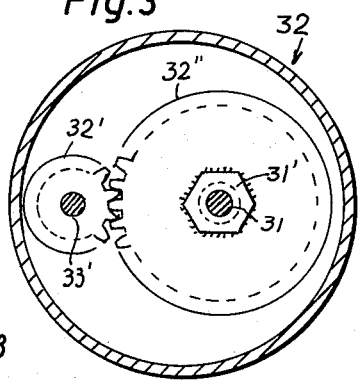
FIG. 5 is a cross-sectional view taken along line V—V of FIG. 2.

A second set of rollers 14 engage the underside of the band 10 and are rotatably journaled between the arms of bifurcated support members 15 for rotation about axes whose inclination to the seam-forming edges 11, 12 is adjustable but which generally extend perpendicularly to these edges. The support members 15 are carried by a block 16 of the base 1 and are angularly displaceable about vertical axes perpendicular to the band. Rollers 14 are arrayed in a plurality of transverse rows at longitudinally spaced locations along the band 10 substantially to the region wherein bending of the band into a cylinder commences. This region generally corresponds to the welding zone. The stems 26 of the support members 15 carry arms 27 whose slots 27' receive pins 28' pivotally connecting these arms with actuating bars 28. The latter are driven by a further rod 30 which is shiftably mounted on the base 16 for displacement along the outer edge 11 (dot-dash lines in FIG. 3) of the band 10. The rollers 14 are also shown in dot-dash lines in this figure inasmuch as they are actually disposed above the cross-section plane. Bar 30 is provided with a threaded extremity 31 received by a nut 31' (FIG. 5) of a speed-reduction transmission 32 operated by an electromotor 33. The shaft 33' of this motor may, for example, carry a pinion 32' in mesh with a driven gear 32'' rigid with the nut 31'. Thus, operation of motor 33 in one sense will rotate the nut 31' to displace the rod 30 to the right (FIG. 2), thereby shifting the longitudinal edge 12 of the band 10 toward the juxtaposed edge 11 at the weld point 13. The motors 24 and 33 are so coupled that the sets of rollers 4 and 14 are rotated simultaneously in opposite senses so that both edges 11, 12 are mutually drawn together or spread apart.

In the manufacture of arc-welded helical seam pipe, it is essential that not only the distance between the edges 11 and 12 be maintained constant, but that the distance between each edge and the median line be substantially invariable. Resistance-welded and induction-welded pipes require that the abutting pressure of the two edges be substantially constant. In the latter case motors 24 and 33 serve to provide precise control of this pressure in the welding zone.

A support 34 extends generally axially into the cylinder-forming shell 2 and is provided with a row of auxiliary rollers 35 which hold the steel band 10 against the upward reaction force of rollers 14 in engagement with the underside 17 of the band. These auxiliary rollers are also provided with support members 36 within which they are journaled for rotation about respective axes parallel to the band 10 and perpendicular to the longitudinal edges thereof. These support members are angularly displaceable about generally radial axes within bushings 37 carried by the support 34. In a manner similar to that described with reference to rollers 4 and 14, the supports 36 are formed with stems 38 which are press-fitted into arms 39 which engage via pins 40' a coupling bar 40 whose extremity 41 is provided with a thread. Rod 40 is driven by a motor 43 via a speed-reducing transmission and nut as shown in FIG. 2 in connection with rollers 14. Motors 33 and 43 may be electrically coupled for synchronous operation so that the rollers 14 and 35 are always driven simultaneously in the identical sense. To this end the motors 33, 43 may be servofollowers operatively coupled to a sensing motor responsive to the position of edge 12. Similarly motor 24 can be coupled for concurrent rotation with the motors 33, 43. Instead of the electromotors described and illustrated, hydraulic servomechanisms can also be employed.

Figure 4:
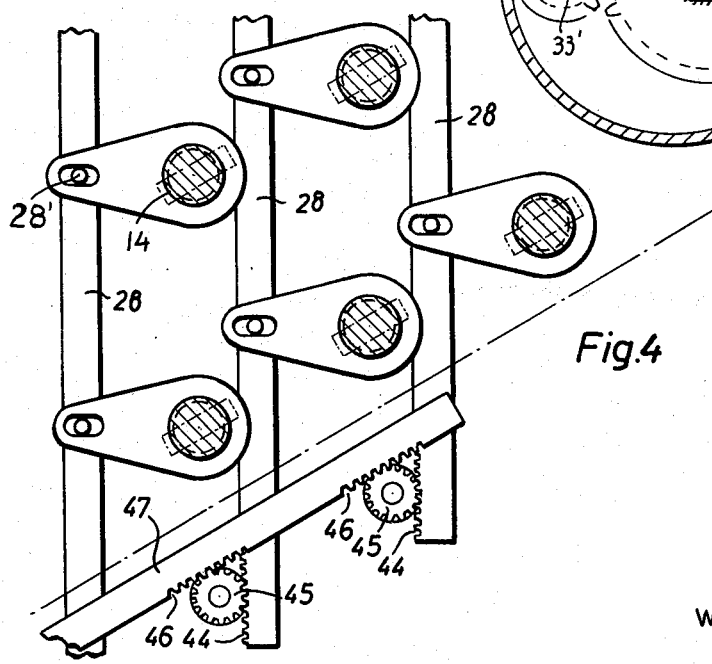
FIG. 4 is a view similar to FIG. 3 illustrating the actuating mechanism of another set of guide elements.

FIG. 4 shows a variation of the actuating mechanism for displacing the rollers 14. In this embodiment the bars 28 are formed with racks 44 in mesh with pinions 45. These pinions are driven by rack teeth 46 formed on a further bar 47 which, like bar 30, may be longitudinally shifted by a motor 33. Angular displacement of the rollers 14 is effected as previously described.

Figure 6:
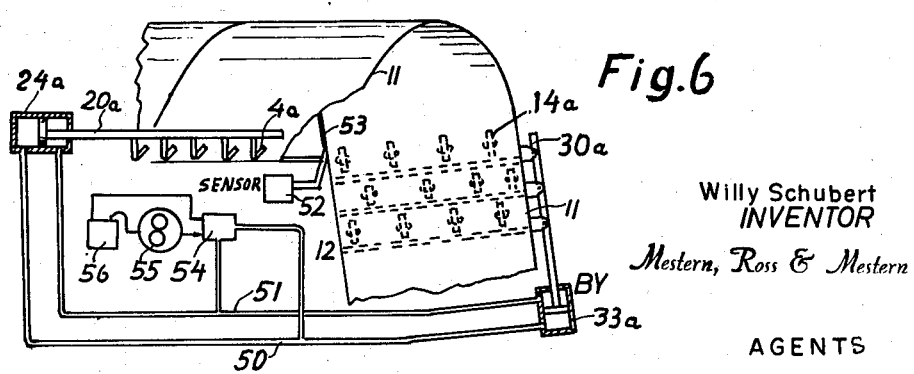
FIG. 6 is a diagrammatic view of an apparatus for making helical-seam pipe according to another embodiment of the invention.

FIG. 6 schematically describes a hydraulic control system for the edges 11 and 12 of the band 10. The servomotors are hydraulic cylinders 24a and 33a which longitudinally displace actuating bars 20a, 30a of the rollers 4a, 14a. These hydraulic cylinders are coupled via fluid-transmission tubes 50, 51 for operation in opposite senses to shift the respective rollers angularly as previously mentioned. A sensing device 52 mechanically detects fluctuations in the welding gap 53 and automatically controls a valve 54 to supply hydraulic fluid from a pump 55 and a reservoir 56 to the appropriate transmission line 50, 51 to compensate for these fluctuations.

The invention as described and illustrated is believed to admit of many variations within the ability of the persons skilled in the art, all such variations being considered within the spirit and scope of the appended claims.

I claim:

1. An apparatus for producing helical-seam pipe, comprising cylinder-forming means for winding a metallic band into a metal tube with a plurality of convolutions upon feeding of said band generally tangentially into said cylinder-forming means at an angle to the axis of said tube; feed means for supplying said band to said cylinder forming means whereby opposite longitudinal edges of said band are juxtaposed upon completion of a convolution; welding means for continuously joining said edges upon juxtaposition thereof to form a helically extending weld bonding adjacent convolutions together; and control means for adjusting the relative positions of said edges upon juxtaposition thereof, said control means including a plurality of guide elements axially spaced apart generally transversely to the direction of band feed in engagement with said band in advance of said welding means and extending generally in planes perpendicular to said band, and adjusting means for angularly displacing said elements about respective axes perpendicular to said band for shifting at least one of said edges to maintain a predetermined relationship between said edges upon juxtaposition thereof.

2. An apparatus for producing helical-seam pipe, comprising cylinder-forming means for winding a metallic band into a metal tube with a plurality of convolutions upon feeding of said band generally tangentially into said cylinder-forming means at an angle to the axis of said tube; feed means for supplying said band to said cylinder-feeding means whereby opposite longitudinal edges of said band are juxtaposed upon completion of a convolution; welding means for continuously joining said edges upon juxtaposition thereof to form a helically extending weld bonding adjacent convolutions together; and control means for adjusting the relative positions of said edges upon juxtaposition thereof, said control means including a plurality of guide rollers axially spaced apart generally transversely to the direction of band feed in engagement with said band in advance of said welding means and extending generally in planes perpendicular to said band while being rotatable about respective axes parallel to said band and perpendicular to said edges, and adjusting means for angularly displacing said rollers about respective axes perpendicular to said band for shifting at least one of said edges to maintain a predetermined relationship between said edges upon juxtaposition thereof.

3. An apparatus according to claim 2 wherein said control means comprises a first set of said rollers in engagement with an undersurface of said band, and respective support members for each of said rollers pivotally mounting same for rotation about respective vertical axes perpendicular to the axis of each roller, said adjusting means including a common actuating member for simultaneously displacing all of the support members of said first set in the same sense.

4. An apparatus according to claim 3, further comprising a link arm secured to each of said support members and extending radially therefrom, said arms being pivotally coupled with said actuating member at respective locations remote from the support members.

5. An apparatus according to claim 4, further comprising drive means for linearly displacing said actuating member, said drive means including a longitudinally displaceable bar shiftable generally parallel to said band, and coupling means interconnecting said bar and said actuating member.

6. An apparatus according to claim 3 wherein said control means further comprises a second set of said rollers in engagement with the outer periphery of said tube along the last-formed convolution thereof, and respective support members for each of the rollers of said second set pivotally securing the latter to said cylinder-forming means with freedom of rotation about respective radial axes, said adjusting means including a further common actuating member for simultaneously displacing all of the support members of said second set in the same sense.

7. An apparatus according to claim 6, further comprising drive means for said actuating members so constructed and arranged as to rotate the support members of said first and second sets in mutually opposite senses for simultaneously displacing both of said longitudinal edges toward and away from a median line therebetween.

8. An apparatus according to claim 7 wherein said drive means includes a pair of motors operatively coupled with said actuating members, further comprising sensing means responsive to the mutual positions of said longitudinal edges for controlling said motors.

9. An apparatus according to claim 3, further comprising an auxiliary set of said rollers in engagement with an upper surface of said band in the region of said first set of rollers for holding said band thereagainst, and respective support members for each of the rollers of said auxiliary set mounting same for rotation about respective vertical axes perpendicular to the axis of each roller, said adjusting means including an auxiliary common actuating member for simultaneously displacing all of the support members of the auxiliary set in the sense of displacement of the support members of the first set.

10. An apparatus according to claim 2 wherein said control means comprises a set of said rollers in engagement with the outer periphery of said tube along the last-formed convolution thereof, and respective support members for each of said rollers pivotally securing the latter to said cylinder-forming means with freedom of rotation about respective radial axes, said adjusting means including a common actuating member for simultaneously displacing all of the support members of said set in the same sense.

11. An apparatus according to claim 10 wherein said cylinder-forming means comprises a generally tubular support and a plurality of rollers mounted on said support in engagement with said band, said rollers of said set being disposed along the fourth quadrant of said support in the direction of winding said band.

12. An apparatus according to claim 11, further comprising drive means for longitudinally displacing said actuating member parallel to the axis of said support, said drive means including a ring gear mounted on said support for rotation about the axis thereof, and a rack formed on said actuating member in mesh with said ring gear.

References Cited in the file of this patent
UNITED STATES PATENTS
3,030,488   Kuckens _____ Apr. 17, 1962